(12) United States Patent  
Kadota et al.

(10) Patent No.: US 11,987,340 B2
(45) Date of Patent: May 21, 2024

(54) HULL BEHAVIOR CONTROL SYSTEM AND MARINE VESSEL

(71) Applicant: YAMAHA HATSUDOKI KABUSHIKI KAISHA, Iwata (JP)

(72) Inventors: Ritsu Kadota, Shizuoka (JP); Tomoyoshi Koyanagi, Shizuoka (JP); Shuichi Moromi, Shizuoka (JP); Sadao Miyano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 472 days.

(21) Appl. No.: 17/348,870

(22) Filed: Jun. 16, 2021

(65) Prior Publication Data  
US 2021/0394883 A1 Dec. 23, 2021

(30) Foreign Application Priority Data

Jun. 17, 2020 (JP) ................. 2020-104818

(51) Int. Cl.  
B63H 25/04 (2006.01)  
B63B 79/15 (2020.01)  
(Continued)

(52) U.S. Cl.  
CPC ............ *B63H 25/04* (2013.01); *B63B 79/15* (2020.01); *B63B 79/20* (2020.01); *B63B 79/40* (2020.01);  
(Continued)

(58) Field of Classification Search  
CPC ........ B63H 25/04; B63H 79/15; B63H 79/20; B63H 79/40; G05D 1/0206; G05D 1/243; G05D 1/2435; G05D 1/606; G06N 20/00  
See application file for complete search history.

(56) References Cited

U.S. PATENT DOCUMENTS 6,890,223 B2 * 5/2005 Kanno .................. F02D 11/105  
440/1  
7,039,512 B2 * 5/2006 Swinbanks ........... B63B 39/005  
248/550  
(Continued)

FOREIGN PATENT DOCUMENTS

CN 108698681 A * 10/2018 ............. B63H 25/04  
EP 3 006 321 A1 4/2016  
(Continued)

OTHER PUBLICATIONS

Translation of CN-108698681-A, 20 pages (Year: 2018).*  
(Continued)

*Primary Examiner* — Dale W Hilgendorf  
(74) *Attorney, Agent, or Firm* — Keating & Bennett, LLP

(57) ABSTRACT

A hull behavior control system for controlling behavior of a hull of a marine vessel includes a memory and at least one controller coupled to the memory. The at least one controller is configured or programmed to control a steering that changes the traveling direction of the marine vessel, obtain a water surface shape around the marine vessel, estimate movement of a wave based on the water surface shape, and when it is determined that the hull rides the wave whose movement has been estimated, control the steering so as to reduce an influence of the wave on the hull.

13 Claims, 13 Drawing Sheets

(51) Int. Cl.
    *B63B 79/20*      (2020.01)
    *B63B 79/40*      (2020.01)
    *G05D 1/00*       (2024.01)
    *G05D 1/243*      (2024.01)
    *G05D 1/606*      (2024.01)
    *G06N 20/00*      (2019.01)

(52) U.S. Cl.
    CPC ........... *G05D 1/0206* (2013.01); *G05D 1/243* (2024.01); *G05D 1/2435* (2024.01); *G05D 1/606* (2024.01); *G06N 20/00* (2019.01)

(56) References Cited

U.S. PATENT DOCUMENTS

| | | |
|---|---|---|
| 2003/0054704 A1 | 3/2003 | Kanno |
| 2004/0024503 A1 | 2/2004 | Swinbanks et al. |
| 2009/0222154 A1* | 9/2009 | Lopriore .............. G05D 1/0206 701/21 |
| 2012/0130569 A1* | 5/2012 | Huntsberger ........ G01C 13/002 348/47 |
| 2014/0114509 A1* | 4/2014 | Venables ................ B63B 39/06 701/21 |
| 2017/0300056 A1* | 10/2017 | Johnson ................ G01P 21/025 |
| 2021/0229791 A1* | 7/2021 | Inoue ..................... B63H 19/02 |
| 2021/0394877 A1* | 12/2021 | Kadota .................. G05D 13/66 |
| 2023/0192262 A1* | 6/2023 | Sawada ................ G05D 1/0206 701/21 |

FOREIGN PATENT DOCUMENTS

| | | |
|---|---|---|
| JP | 01-262291 A | 10/1989 |
| JP | 3345611 B2 | 11/2002 |
| JP | 2003-097309 A | 4/2003 |
| JP | 2008-044472 A | 2/2008 |
| JP | 2009-214879 A | 9/2009 |
| JP | 2017-058322 A | 3/2017 |
| WO | 2014/192532 A1 | 12/2014 |
| WO | WO-2021074483 A1 * | 4/2021 ............. B63H 25/42 |

OTHER PUBLICATIONS

Zipwake, "Operators Manual Dynamic Trim Control System", Retrieved from the Internet http://www.zipwake.com, retrieved on Jun. 3, 2020, 147 pages.

\* cited by examiner

HULL BEHAVIOR CONTROL SYSTEM AND MARINE VESSEL

CROSS REFERENCE TO RELATED APPLICATIONS

This application claims the benefit of priority to Japanese Patent Application No. 2020-104818 filed on Jun. 17, 2020. The entire contents of this application are hereby incorporated herein by reference.

BACKGROUND OF THE INVENTION

1. Field of the Invention

The present invention relates to hull behavior control systems for controlling hulls traveling on waves and to marine vessels traveling on waves.

2. Description of the Related Art

When a marine vessel sails on waves, behavior of a hull is affected by the waves. In particular, a hull can become unstable by being hit broadside by a wave, which may result in capsizing of the marine vessel. In view of that, a technique to control the traveling direction of a hull in waves so as to prevent the hull from being hit broadside by a wave is known (e.g., see Japanese Laid-open Patent Publication (JP-A) No. 2017-58322).

In the technique disclosed in JP-A No. 2017-58322, a hull is controlled so that the bow or stern of the hull faces the waves. In such a technique, for example, a laser radar mounted on the hull detects waves around a marine vessel, and the detected waves are divided into groups of multiple waves. The direction of the waves is then estimated from the velocity vector of one or more of the groups of waves, and the steering device is controlled so that the bow or stern of the hull faces the waves in accordance with the estimated direction of the waves.

However, in the technique disclosed in JP-A No. 2017-58322, the control of the steering device can result in the marine vessel sailing with its bow facing waves, and the hull thus sometimes rides a wave. If the wave height of the wave on which the hull rides is high, the hull after traveling over the wave and falling onto the water is hit by the water with an excessive impact force. Thus, there is still room for improvement in controlling behavior of a hull of a marine vessel from a viewpoint of reducing damage to the hull and a viewpoint of providing comfort to the crew.

SUMMARY OF THE INVENTION

Preferred embodiments of the present invention provide hull behavior control systems and marine vessels that are each able to reduce damage to hulls and improve the comfort of the crew.

According to a preferred embodiment of the present invention, a hull behavior control system for controlling behavior of a hull of a marine vessel including a steering that changes a traveling direction of the marine vessel includes a memory and at least one controller coupled to the memory. The at least one controller is configured or programmed to control the steering that changes the traveling direction of the marine vessel, obtain a water surface shape around the marine vessel, estimate movement of a wave based on the water surface shape, and upon determining that the hull rides the wave whose movement has been estimated, control the steering so as to reduce an influence of the wave on the hull.

According to another preferred embodiment of the present invention, a marine vessel includes a hull, a steering that changes a traveling direction of marine vessel, and the above-descried hull behavior control system.

According to another preferred embodiment of the present invention, a hull behavior control system for controlling behavior of a hull of a marine vessel including a steering that changes a traveling direction of the marine vessel includes a memory and at least one controller coupled to the memory. The at least one controller is configured or programmed to control the steering that changes the traveling direction of the marine vessel, obtain a water surface shape around the marine vessel, and upon determining that the hull rides a wave around the marine vessel based on the water surface shape, control the steering so as to reduce an influence of the wave on the hull.

According to preferred embodiments of the present invention, when it is determined that the hull of the marine vessel rides a wave (e.g., a wave whose movement has been estimated) around the marine vessel, the at least one controller controls a steering that changes the traveling direction of the marine vessel so as to reduce the influence of the wave on behavior of the hull. This prevents the bow of the marine vessel from leaving the crest of a wave. As a result, this avoids the impact force, which comes from landing of the marine vessel onto the water, acting on the vessel bottom of the marine vessel which reduces damage to the hull and improves the comfort of the crew.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 11A, 11B, and 11C are views for explaining cost maps used to generate an optimum route.

DETAILED DESCRIPTION OF THE PREFERRED EMBODIMENTS

Hereinafter, preferred embodiments of the present invention will be described with reference to the drawings.

Figure 1:
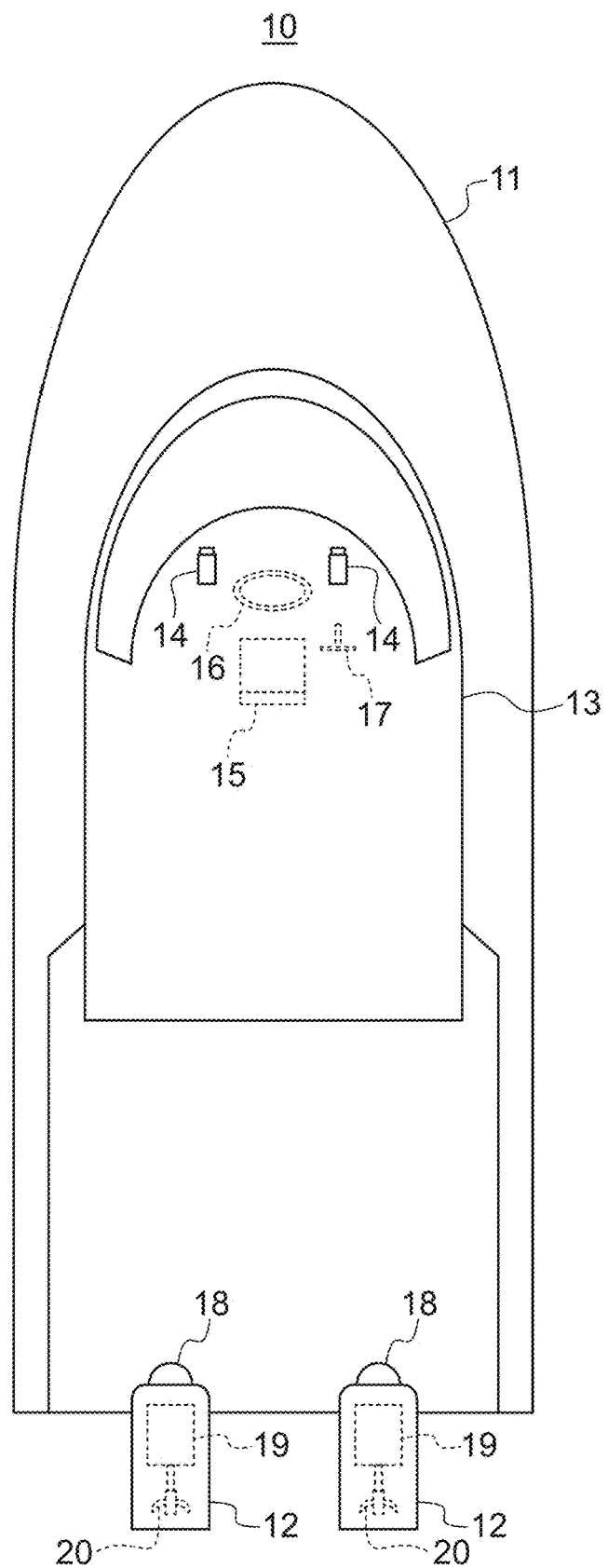
FIG. 1 is a plan view of a marine vessel to which a hull behavior control system according to a preferred embodiment of the present invention is provided.

FIG. 1 is a plan view of the marine vessel to which the hull behavior control system according to a preferred embodiment of the present invention is provided. A marine vessel 10 is, for example, a planing boat, and includes a hull 11 and two outboard motors 12 mounted on the hull 11, in which the outboard motors 12 define and function as marine propulsion devices. The hull 11 is provided with a cabin 13, and the roof of the cabin 13 is provided with a stereo camera 14 that captures the condition of a water surface around, in particular, ahead of the marine vessel 10. In the vicinity of a cockpit 15 in the cabin 13, a steering wheel 16 and a throttle lever 17 are provided.

Each of the outboard motors 12 is mounted on the stern of the hull 11 via a mounting unit 18. Each of the outboard motors 12 includes an engine 19 which defines and functions as a drive source, and a screw propeller 20 which defines and functions as a propeller. Each of the outboard motors 12 generates a propulsive force to move the hull 11 by the screw propeller 20 being rotated by a driving force of the engine 19. The mounting unit 18 includes a steering mechanism 21 (an example of a steering) and a power trim and tilt mechanism, in which the steering mechanism 21 includes a steering shaft and an electric motor. Each of the outboard motors 12 is rotatable about the steering shaft so that it is able to turn right and left about the steering shaft in response to a vessel operator's operation of the steering wheel 16. With the outboard motors 12 turning in response to the operation of the steering wheel 16, the marine vessel 10 is steered.

The marine vessel 10 further includes an anemometer that measures the direction and wind speed of wind in the vicinity, a gyroscope that measures the posture of the hull 11, and an accelerometer that measures the acceleration and its direction of the hull 11.

Figure 2:
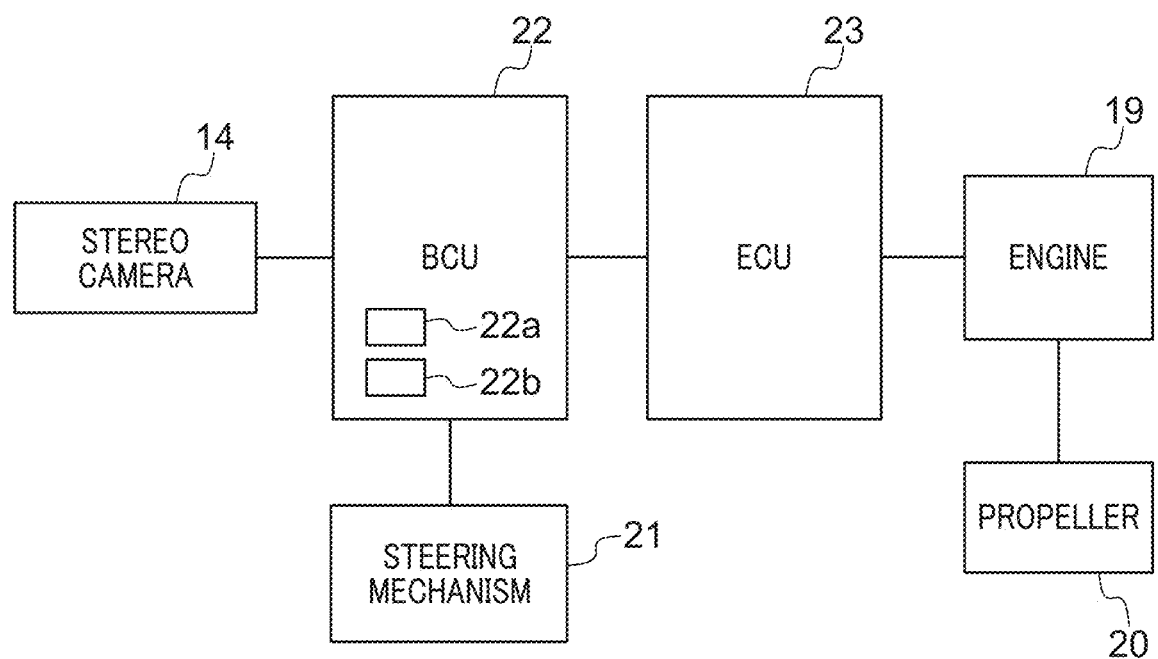
FIG. 2 is a block diagram schematically illustrating a configuration of the hull behavior control system according to a preferred embodiment of the present invention.

FIG. 2 is a block diagram schematically illustrating the configuration of the hull behavior control system according to a preferred embodiment of the present invention. The hull behavior control system includes a boat control unit (BCU) 22 to which the stereo camera 14 is connected, and an engine control unit (ECU) 23 that controls the engine 19. The BCU 22 includes a memory 22a and a CPU 22b, and functions as a water surface shape obtainer that obtains a water surface shape around the marine vessel 10 based on information output from a sensor or receiver mounted on the marine vessel 10, and also functions as a controller that controls a steering (in the present preferred embodiment, steering mechanism 21) that changes the traveling direction of the marine vessel 10. In the present preferred embodiment, the BCU 22 performs image processing on an image captured by the stereo camera 14 to obtain data of a water surface shape around the marine vessel 10. In the BCU 22, the CPU 22b executes a program stored in the memory 22a thus executing the hull behavior control process described below and controlling the operation of the steering mechanism 21. The ECU 23 functions as a controller that controls the engine 19. In the present preferred embodiment, based on the control signal transmitted from the BCU 22, the ECU 23 controls the rotational speed of the engine 19 and controls the rotational speed of the screw propeller 20.

Figure 3:
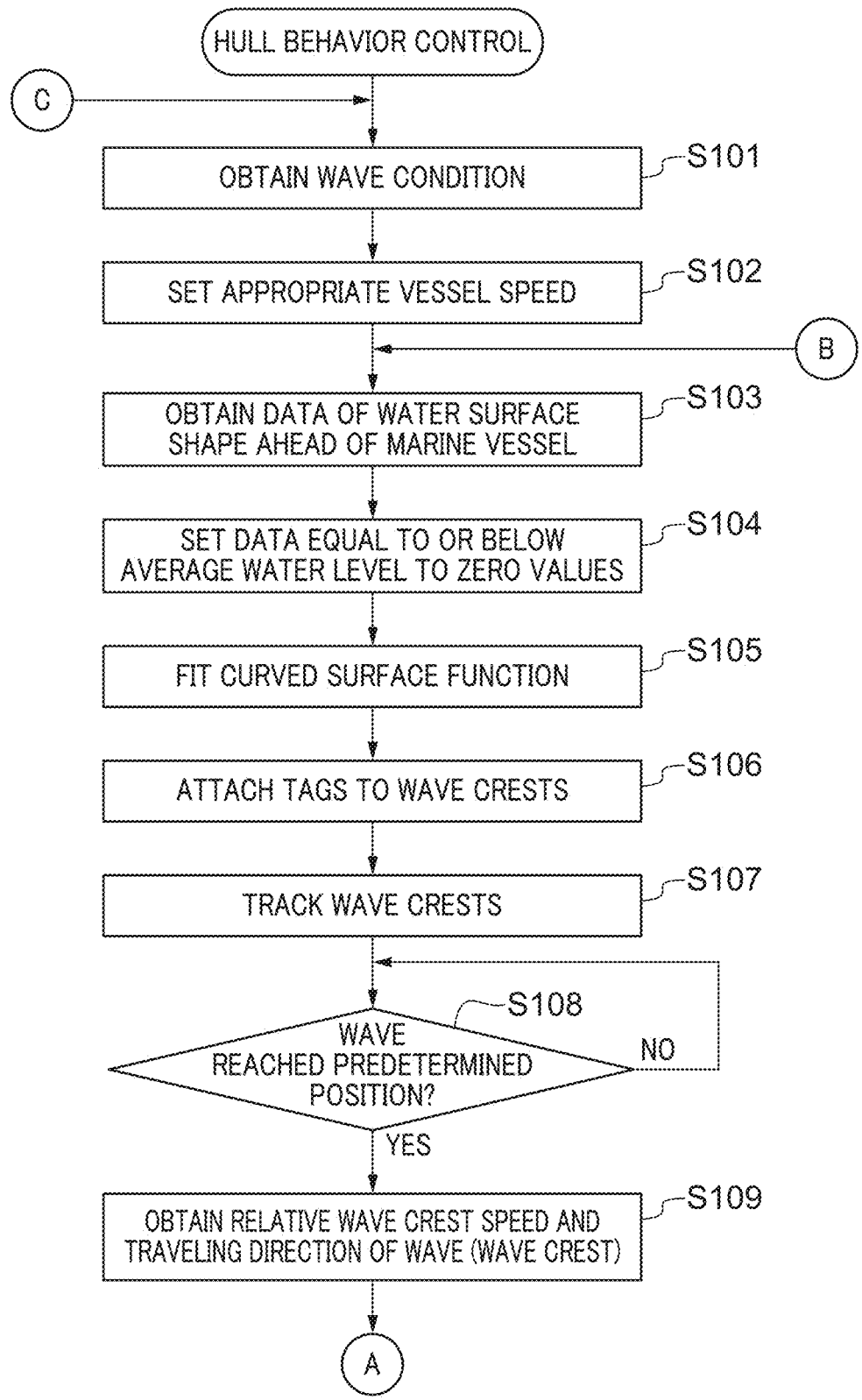
FIG. 3 is a flowchart illustrating a hull behavior control process performed by a BCU.
Figure 4:
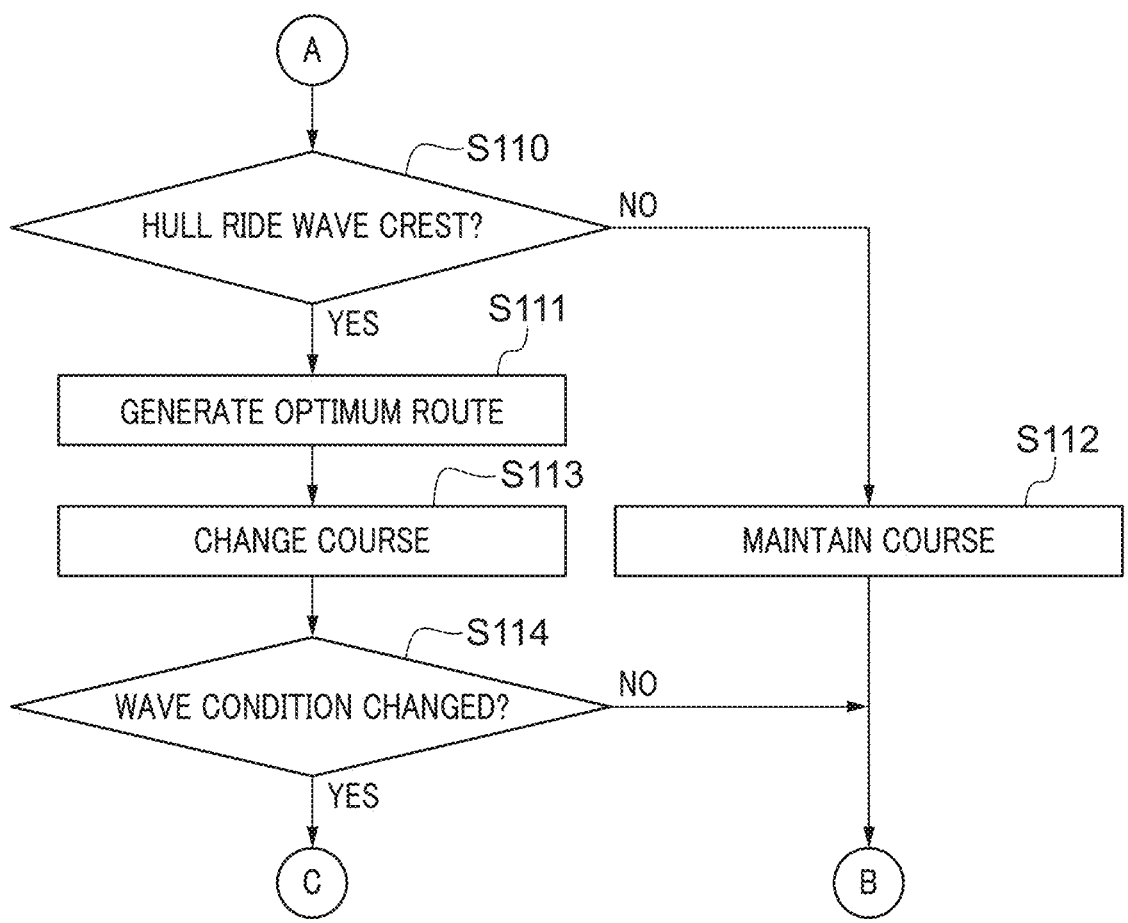
FIG. 4 is a flowchart illustrating the hull behavior control process performed by the BCU.

FIGS. 3 and 4 are flowcharts illustrating the hull behavior control process performed by the BCU 22. First, the BCU 22 causes the stereo camera 14 to capture the condition of the water surface around the marine vessel 10, causes the anemometer or the like to measure the direction and wind speed of the wind in the vicinity of the marine vessel 10, causes the gyroscope to measure the posture of the hull 11, causes the accelerometer to measure the acceleration and its direction of the hull 11, and obtains the wave condition around the hull 11 from these measurement results (step S101).

Next, the BCU 22 sets an appropriate vessel speed based on the obtained wave condition around the marine vessel (step S102). Instead of the steps S101 and S102, a vessel operator may set an appropriate vessel speed by visually or physically determining the condition of the water surface around the marine vessel 10, the direction and wind speed of the wind in the vicinity of the marine vessel 10, and the posture of the hull 11, and then operating the throttle lever 17 based on these variables.

Figure 5A:
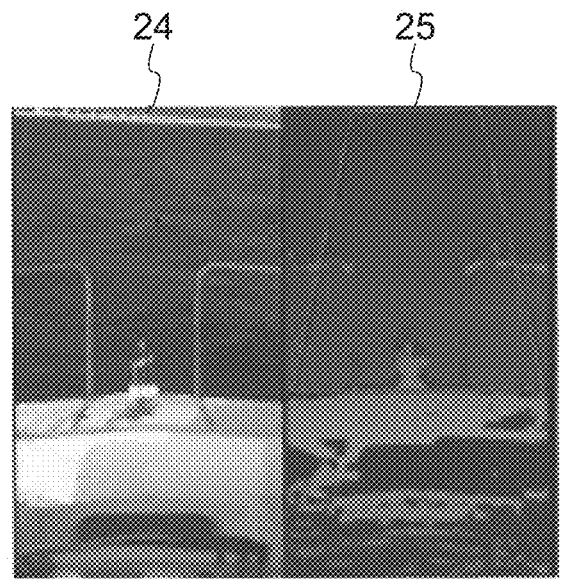
FIGS. 5A and 5B are views for explaining a process of obtaining three-dimensional data of a water surface shape from an image captured by a stereo camera.
Figure 5B:
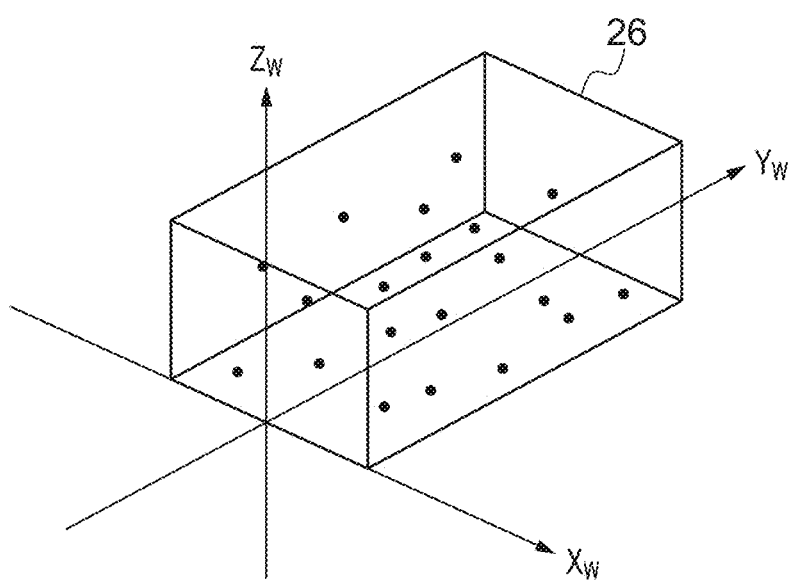

Next, the BCU 22 performs image processing on the image captured by the stereo camera 14 to obtain data of a water surface shape ahead of the marine vessel 10 (step S103). Specifically, the BCU 22 performs image processing on an image (FIG. 5A) of the condition of the water surface ahead of the marine vessel 10 captured by the stereo camera 14, and obtains an image 25 (FIG. 5A) in which edges or other information contents of the image are enhanced. From the image 25, the BCU 22 further obtains three-dimensional data 26 (undulation information of three-dimensional water surface shape) of the water surface shape ahead of the marine vessel 10 (FIG. 5B). In FIG. 5B, Yw indicates the position of the water surface in the traveling direction of the marine vessel 10, and Xw and Zw indicate the positions of the water surface in directions perpendicular to Yw, respectively.

Figure 6:
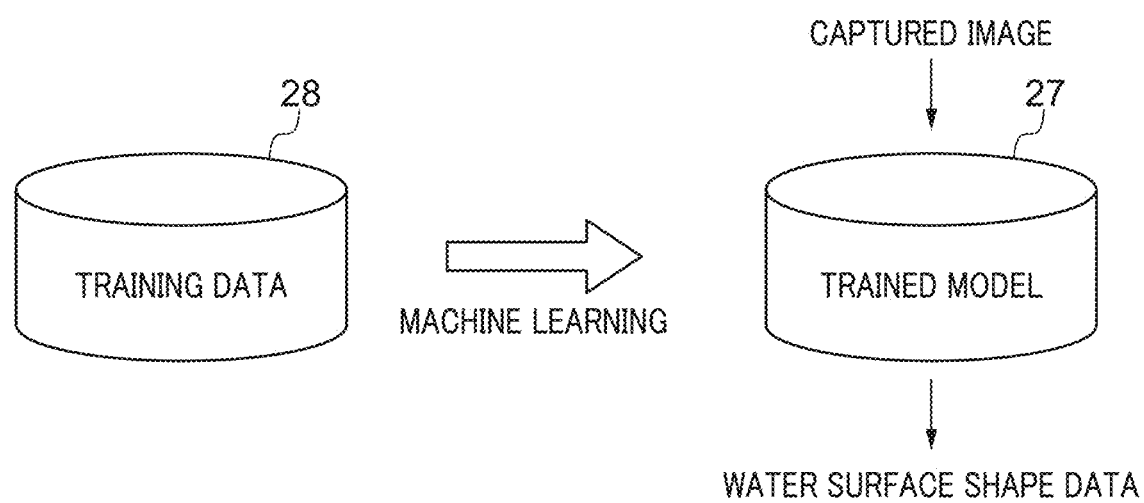
FIG. 6 is a diagram for explaining a trained machine learning model for outputting three-dimensional data of a water surface shape.

The way to obtain the three-dimensional data 26 of the water surface shape is not limited to that using the stereo camera 14. For example, the BCU 22 may input the image 24 of the condition of the water surface ahead of the marine vessel 10 to a trained machine learning model 27 (first machine learning model) configured as, for example, a convolutional neural network, and receive the three-dimensional data 26 of the water surface shape output from the trained machine learning model 27. As illustrated in FIG. 6, the trained machine learning model 27 is generated by machine learning using training data 28, and is configured so as to output three-dimensional data of the water surface shape in response to input of a captured image of the condition of the water surface. Here, the training data 28 includes a large number of images of the water surface conditions captured by the stereo camera 14 for the training, and these images are associated with corresponding three-dimensional data of the water surface shape obtained from the respective images.

Next, the BCU 22 estimates the shape of waves in the three-dimensional data 26 of the water surface shape in order to predict or estimate the movement of waves based on the three-dimensional data 26 of the water surface shape having been obtained. For ease of understanding, FIGS. 7A, 7B, and 7C and FIGS. 8A, 8B, and 8C, which correspond to steps S105 to S107 below, will be described using data of the wave height and the distance from the hull 11 along one direction from the hull 11, cut out from the three-dimensional data 26 of the water surface shape.

Figure 7A:
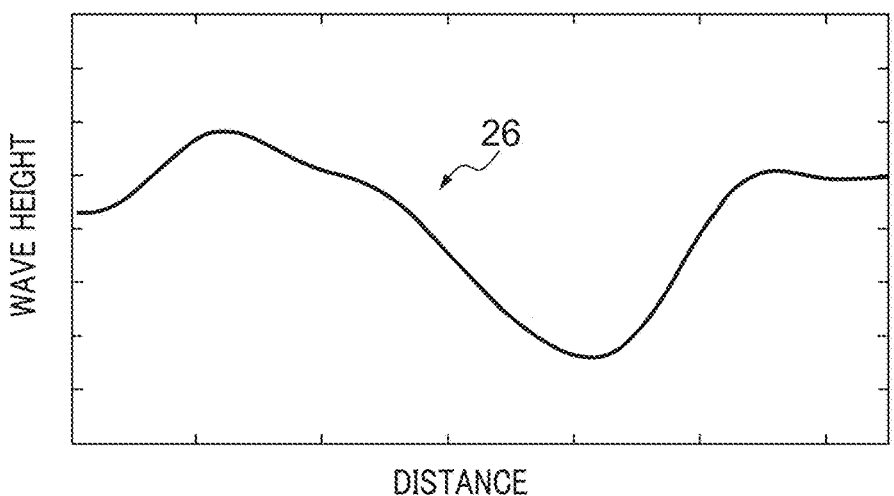
FIGS. 7A to 7C are views for explaining a process of estimating a wave shape from three-dimensional data of a water surface shape.
Figure 7B:
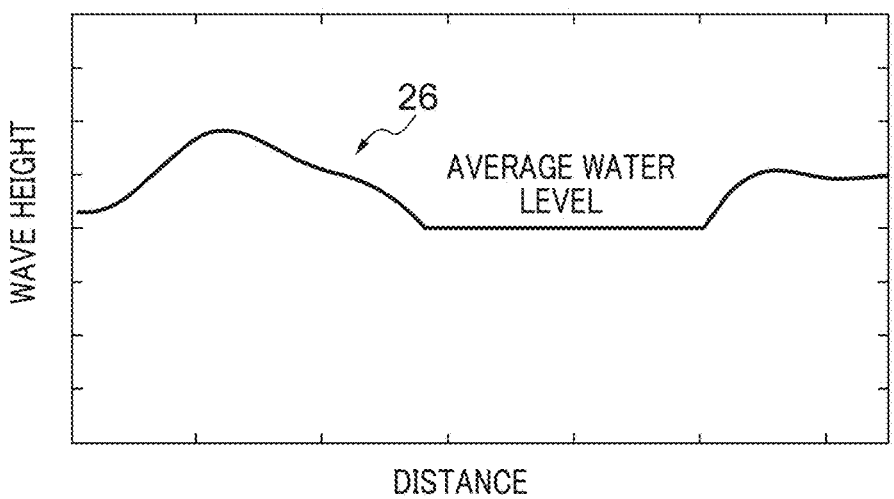
Figure 7C:
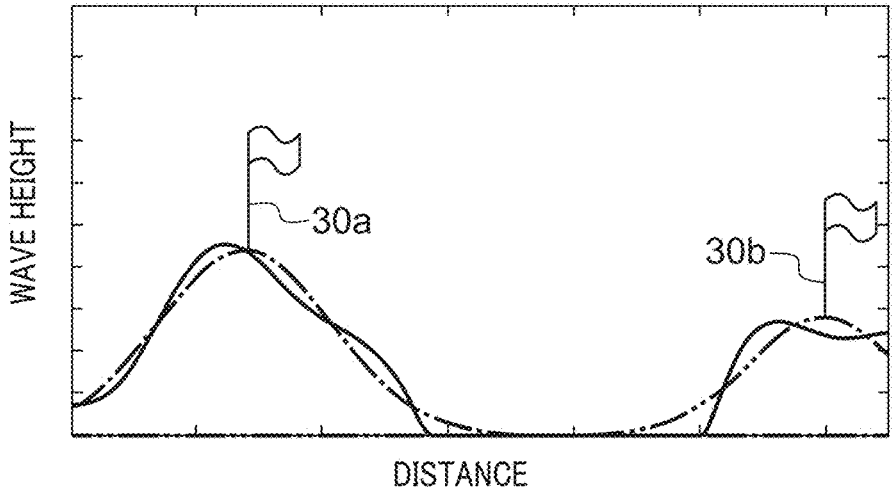

First, in step S104, the BCU 22 sets the data equal to or below the average water level in the three-dimensional data 26 of the water surface shape (FIG. 7A) to zero values and deletes information equal to or below the average water level from the three-dimensional data 26 of the water surface shape (FIG. 7B). This emphasizes a wave crest portion or portions in the three-dimensional data 26 of the water surface shape. For example, in the case illustrated in FIG. 7B, two wave crest portions are emphasized in the three-dimensional data 26 of the water surface shape.

Thereafter, the BCU 22 fits a curved surface function to the three-dimensional data 26 of the water surface shape in which the wave crest portion or portions are emphasized in this manner (step S105), and estimates the shape of waves. Each estimated wave is indicated by a one-dot chain line or a two-dot chain line in FIG. 7C.

The BCU 22 next extracts the crest of each wave in the fitted curved surface function, attaches tags 30a and 30b to the respective wave crests (step S106), and tracks wave crests (step S107).

Figure 8A:
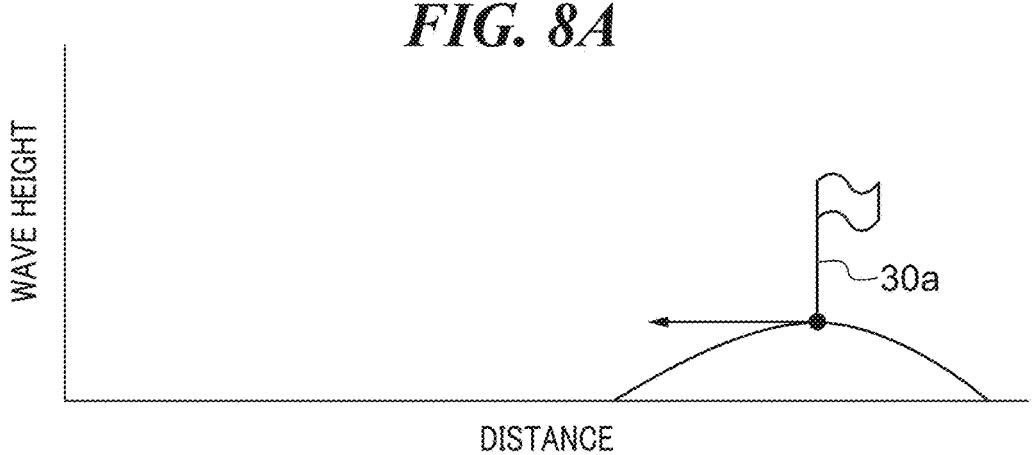
FIGS. 8A to 8C are views illustrating how to track a wave crest.
Figure 8B:
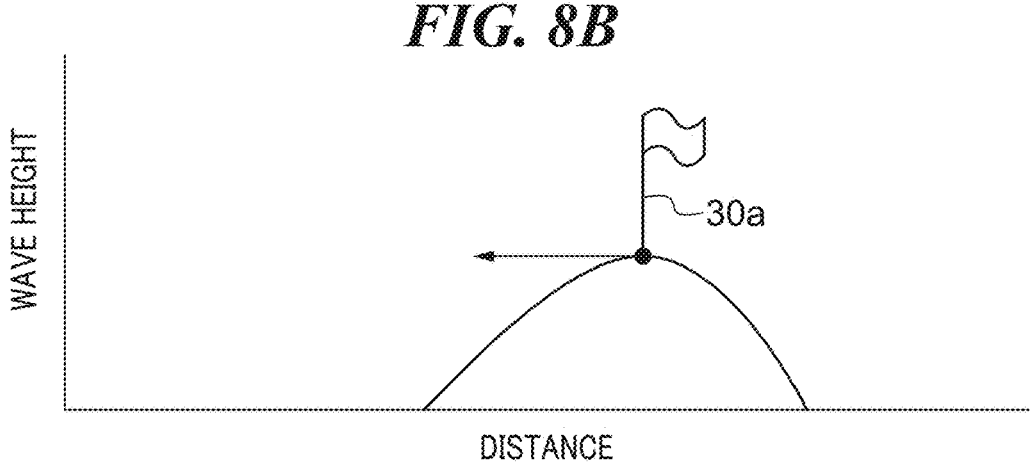
Figure 8C:
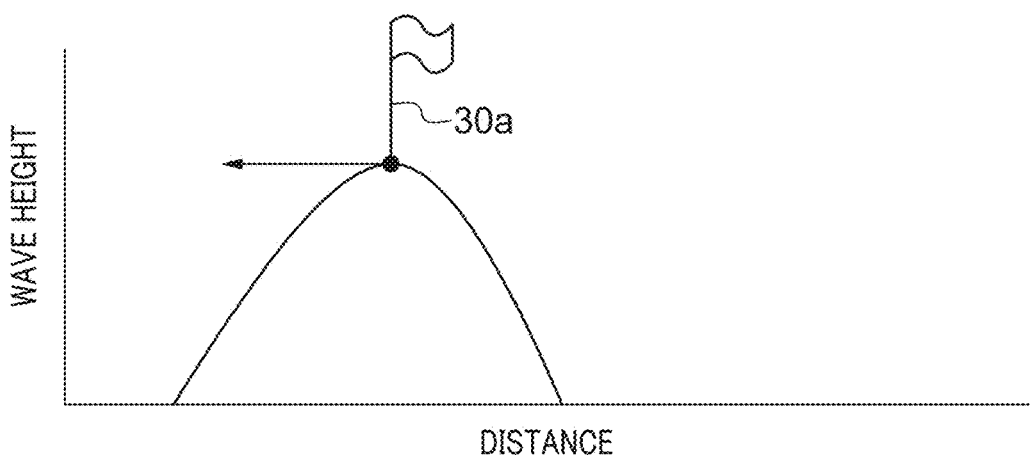

FIGS. 8A to 8C illustrate how to track the wave crest with the tag 30a. Here, the BCU 22 tracks the tag 30a using the Kalman filter and predicts or estimates the deformation and movement of each wave. Specifically, from the position and height of the wave crest to which the tag 30a is attached in step S106, the BCU 22 repeatedly estimates the position and height of the wave crest that changes over time by using a state equation and an observation equation (FIGS. 8A to 8C).

At this time, by using the state equation and observation equations of the Kalman filter to repeatedly estimate the position and height of each point constituting the wave with the tag 30a, which changes over time, the BCU 22 predicts or estimates also the shape and movement of the whole of waves. Thus, the BCU 22 obtains the wave height, the wave trough height (depth of the wave bottom), the traveling speed, the distance from the hull 11, the traveling direction, and the lateral undulation shape for each of multiple waves ahead of the hull 11.

Figure 9A:
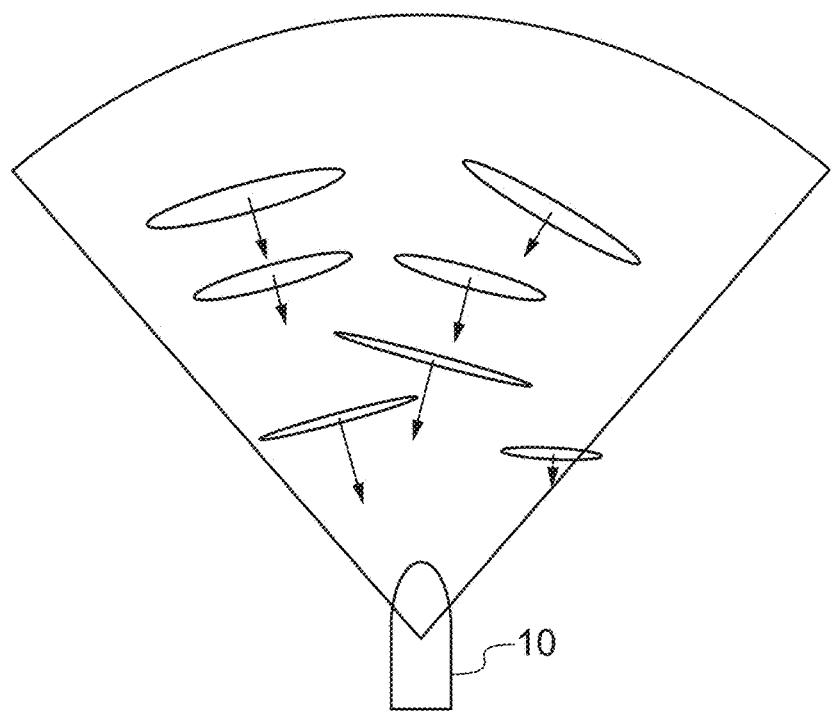
FIGS. 9A and 9B are maps illustrating the traveling speed, the distance to the hull, the traveling direction, and the lateral undulation shape of each wave obtained based on the Kalman filter.
Figure 9B:
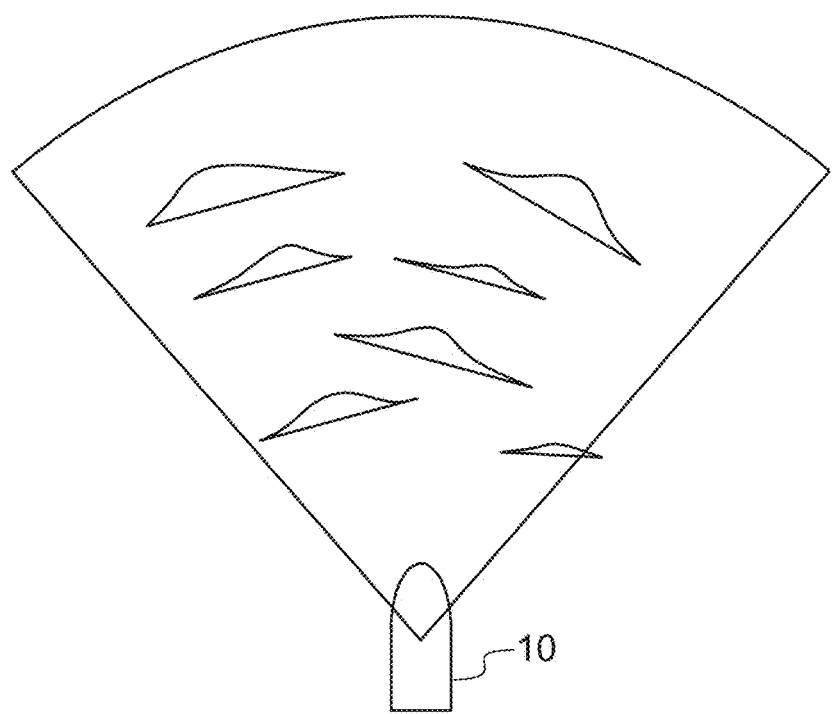

FIG. 9A is a map illustrating the traveling speed of each wave having been obtained, the distance to the hull 11 from each wave having been obtained, and the traveling direction of each wave having been obtained, in which each wave is indicated by an ellipse. FIG. 9B is a map illustrating the lateral undulation shape of each wave having been obtained. In FIG. 9B, the lateral undulation shape of each wave is indicated by a mountain shape along the direction perpendicular to the traveling direction of the corresponding wave.

Next, the BCU 22 determines whether or not the wave with the tag 30a has approached the hull 11 and reached a predetermined position (step S108), and if the wave has not reached the predetermined position, the BCU 22 repeats step S108. If the wave with the tag 30a has reached the predetermined position, the BCU 22 generates a trigger signal, and obtains, based on the trigger signal, the relative (approaching) speed between the corresponding wave (the crest of the wave) and the marine vessel 10 (the hull 11) and the traveling direction of the corresponding wave (step S109), in which the relative (approaching) speed is hereafter referred to as a "relative wave crest speed". The predetermined position may be, for example, a position separated by a predetermined distance from the center of gravity of the hull 11, and is a position where at least the hull 11 does not ride the wave with the tag 30a.

When the marine vessel 10 rides a wave, an angle of attack is provided to the hull 11. Furthermore, when the hull 11 of the marine vessel 10 rides the crest of a wave, the marine vessel 10 moves according to the inertia force caused by the vessel speed and the bow sometimes leaves the water due to the inertia force. Then, when the hull 11 lands on the water again after the bow leaves the water, the vessel bottom of the hull 11 is hit by the water surface, and an excessive impact force acts on the hull 11. To solve this problem, in the present preferred embodiment, when it is determined that the hull 11 of the marine vessel 10 rides a wave around it, in particular, the crest of the wave, the BCU 22 automatically steers the marine vessel 10 with the steering mechanism 21, and changes the traveling direction of the marine vessel 10 so as to reduce the influence of the wave on the behavior of the hull 11, specifically so that the hull 11 avoids the wave crest or so that the hull 11 moves away the wave crest.

In step S110, the BCU 22 analyzes the relative wave crest speed and traveling direction of the wave with the tag 30a attached in step S109, and determines whether or not the hull 11 rides the wave crest. Specifically, the BCU 22 determines whether or not the hull 11 collides with the wave crest based on the relative wave crest speed and traveling direction of the wave with the tag 30a. Even if the hull 11 does not ride the crest of the wave, the behavior of the hull 11 riding the slope of a wave may be affected by the wave and result in that the hull 11 is hit by a water surface and thus an impact force acts on the hull 11. Therefore, in step S110, the BCU 22 may determine whether or not the behavior of the hull 11 that rides the wave is affected by the wave, without determining whether or not the hull 11 rides the wave crest.

Figure 10:
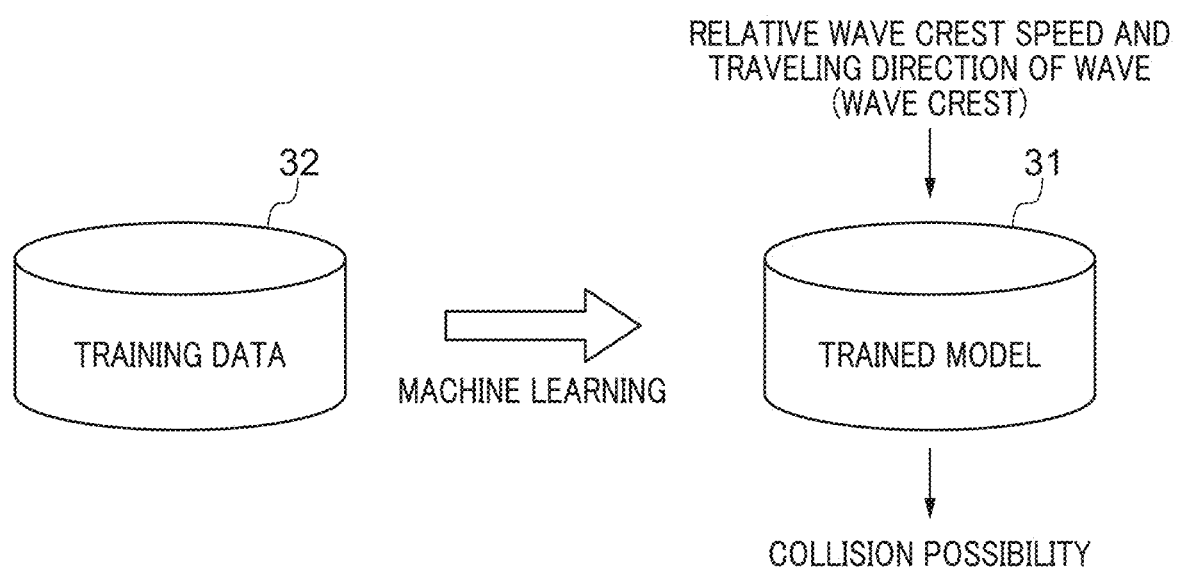
FIG. 10 is a diagram for explaining a trained machine learning model for outputting a collision possibility.

The BCU 22 may input the relative wave crest speed and traveling direction of the wave with the tag 30a to the trained machine learning model 31 (second machine learning model) configured as, for example, a convolutional neural network, and receive the possibility of collision between the hull 11 and the wave crest (collision possibility between the marine vessel 10 and the wave) output from the trained machine learning model 31. As illustrated in FIG. 10, the trained machine learning model 31 is generated by machine learning using training data 32, and is configured so as to output the possibility of collision between the hull 11 and the wave crest (the collision possibility between the marine vessel 10 and the wave) in response to input of the relative wave crest speed and traveling direction of the wave. Here, the training data 32 includes a large number of relative wave crest speeds and traveling directions of the wave, and the relative wave crest speeds and traveling directions of the wave are associated with the corresponding collision possibilities between the hull 11 and the wave crest.

As a result of the determination in step S110, the process proceeds to step S111 if it is determined that the hull 11 rides the crest of the wave with the tag 30a, and the process proceeds to step S112 if it is determined that the hull 11 does not ride the crest of the wave. In step S112, the course of the marine vessel 10 is maintained without any change. Thereafter, the process returns to step S103.

On the other hand, in step S111, the BCU 22 generates an optimum route in which the hull 11 does not ride the wave crest and the influence of the wave on the behavior of the hull 11 is reduced. In the present preferred embodiment, a cost map or maps are used to generate an optimum route.

Figures 11A, 11B, 11C:
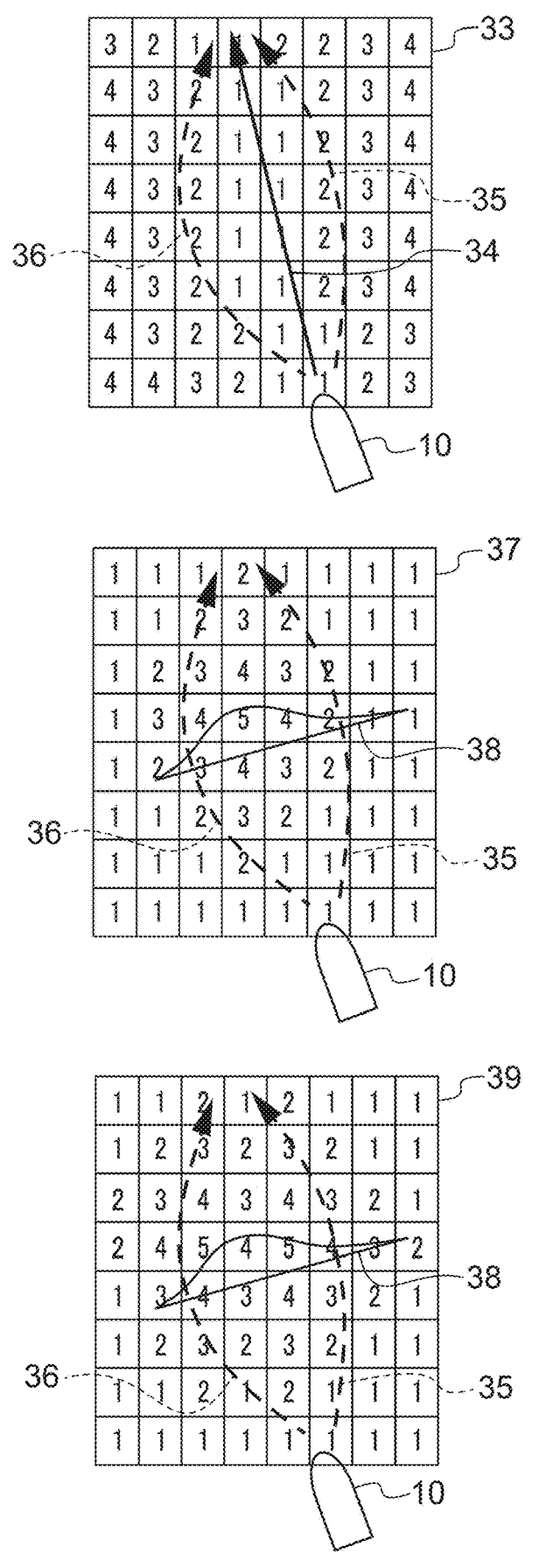

FIGS. 11A to 11C are views for explaining the cost maps used to generate the optimum route. In the present preferred embodiment, the optimum route is generated by using a cost map for each of the three parameters, the deviation amount from the ideal route, the vertical acceleration due to a wave, and the roll angle generated in the hull 11. Here, the ideal route is, for example, a straight water route to reach the destination in the shortest distance.

In a cost map 33 for the deviation amount from the ideal route, as illustrated in FIG. 11A, a score is given as a cost in accordance with the deviation amount from an ideal route 34 at each position. The more the deviation from the ideal route 34 is, the less advantageous it becomes because of the longer period of time it takes to reach the destination, and the more fuel consumption, and thus the more the deviation from the ideal route 34 is, the higher the scores become.

The BCU 22 prepares multiple candidate routes for the cost map 33. Here, in order to avoid the riding of the hull 11 onto the wave crest of an approaching wave, there are the following two possible candidate routes, a route for starboarding toward the wave crest and a route for porting toward the wave crest. The BCU 22 prepares at least these candidate routes 35 and 36 for the cost map 33. Then, the BCU 22 accumulates the score at each position where the candidate route 35 passes, and accumulates the score at each position where the candidate route 36 passes.

In a cost map 37 for vertical acceleration due to a wave, as illustrated in FIG. 11B, the score is given as a cost in accordance with the distance from the crest of a wave 38 with the tag 30a at each position. The vertical acceleration due to a wave is the acceleration in the vertical direction applied to the hull 11 riding the wave, and becomes larger as it approaches the crest of the wave. Then, the closer to the wave crest it gets, the less advantageous it becomes because it is easier for the bow to leave the water, and thus the score becomes large as the bow gets closer to the wave crest. For the cost map 37, the candidate routes 35 and 36 are prepared in the same manner as those for the cost map 33. Then, the BCU 22 accumulates the score at each position where the candidate route 35 passes, and accumulates the score at each position where the candidate route 36 passes.

The roll angle generated in the hull 11 of the marine vessel 10 riding on a wave varies in accordance with the lateral inclination angle of the wave at the location where the marine vessel 10 rides, and the greater the lateral inclination angle is, the greater the roll angle becomes. Therefore, in a cost map 39 for the roll angle applied to the hull 11, as illustrated in FIG. 11C, the score is given as a cost in accordance with the distance from the location where the inclination angle is the largest on the right and left of the wave 38 at each position. The more it approaches a location with the largest inclination angle, the less advantageous it becomes because as the roll angle increases it is easier to disturb the behavior of the hull 11, and thus the closer to the location with the largest lateral inclination angle of the wave 38 it gets, the higher the score becomes. In the cost map 39, the candidate routes 35 and 36 are prepared in the same manner as those for the cost map 33 and the cost map 37. Then, the BCU 22 accumulates the score at each position where the candidate route 35 passes, and accumulates the score at each position where the candidate route 36 passes.

Thereafter, the BCU 22 compares the sum of the accumulated values of the scores on the candidate route 35 calculated for the three cost maps 33, 37, and 39 with the sum of the accumulated values of the scores on the candidate route 36 calculated for the three cost maps 33, 37, and 39. The larger the sum of the accumulated value of the scores is, the higher the cost becomes, which is less advantageous, and thus the BCU 22 generates the candidate route having the smaller sum of the accumulated values of the scores as the optimum route. In the case of FIGS. 11A to 11C, the candidate route 35 is generated as the optimum route.

The number of candidate routes prepared for each of the cost maps 33, 37, and 39 is not limited to 2, and for example, two routes for starboarding toward the wave crest and two routes for porting toward the wave crest may be prepared.

Figure 12:
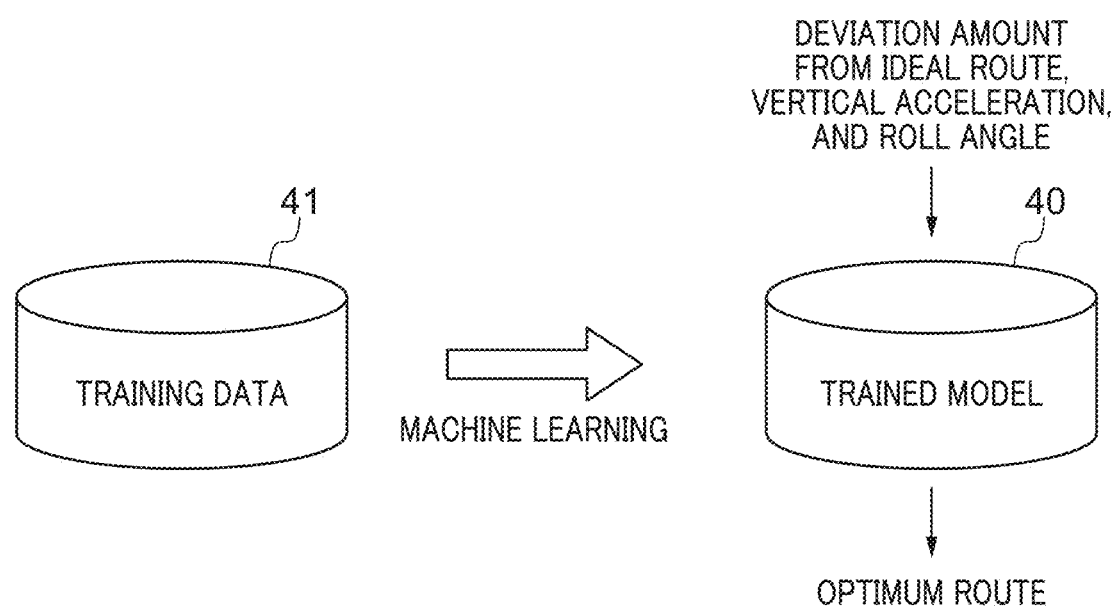
FIG. 12 is a diagram for explaining a trained machine learning model for outputting an optimum route.

The method for generating the optimum route is not limited to a method using cost maps, and for example, the BCU 22 may input the deviation amount from the ideal route, the vertical acceleration due to a wave, and the roll angle generated in the hull 11 to trained machine learning model 40 (third machine learning model) configured as a convolutional neural network, and receive the optimum route output from the trained machine learning model 40. At this time, the optimum route to be output is expressed by, for example, a combination of a large number of vectors. As illustrated in FIG. 12, the trained machine learning model 40 is generated by machine learning using the training data 41, and is configured to output the optimum route in response to input of the deviation amount from the ideal route, the vertical acceleration due to a wave, and the roll angle generated in the hull. Here, the training data 41 includes a large number of deviation amounts from the ideal route, vertical accelerations due to a wave, and roll angles generated in the hull, and these deviation amounts from the ideal route, vertical accelerations due to a wave, and roll angles generated in the hull are associated with the corresponding optimum routes.

Figure 13:
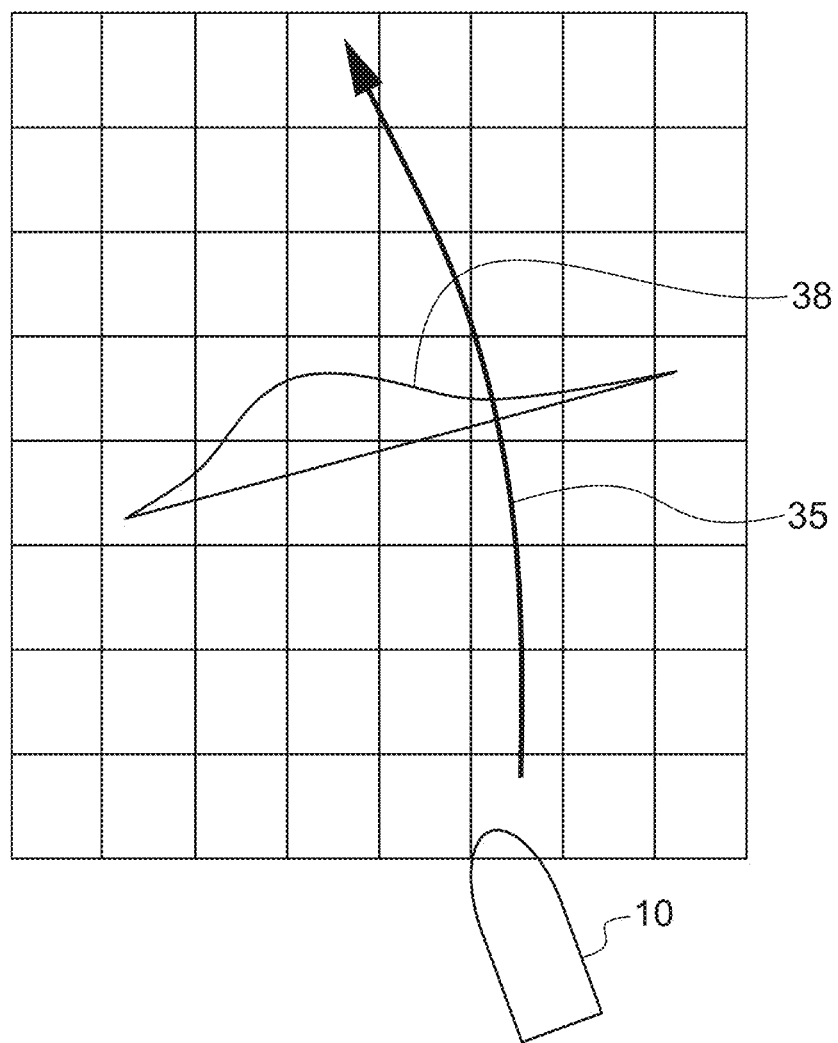
FIG. 13 is a diagram for explaining a course change in accordance with an optimum route.

Returning to FIG. 4, next, in step S113, the BCU 22 changes the course of the hull 11 so as to follow the generated optimum route by controlling the steering mechanism 21 (FIG. 13). Thus, the marine vessel 10 is able to avoid riding the crest of the wave 38.

Thereafter, in step S114, as in step S101, the BCU 22 obtains the wave condition around the hull 11, and determines whether or not the wave condition around the hull 11 obtained in step S101 has changed. The process returns to step S101 if it is determined that the wave condition around the hull 11 has changed, and the process returns to step S103 if it is determined that the wave condition around the hull 11 has not changed.

The steps S107 to S114 of the hull behavior control process described above are executed not only for the wave 38 but also for the wave with the tag 30b and other waves. That is, steps S107 to S114 of the hull behavior process of the hull described above are executed for each wave.

According to the present preferred embodiment, the BCU 22 estimates movement of waves around the marine vessel 10 based on the obtained water surface shape, and when it is determined that the hull 11 rides the crest of the wave 38 out of the waves whose movement has been estimated, generates an optimum route to avoid the crest of the wave. The BCU 22 changes the course of the hull 11 so as to follow the generated optimum route by controlling the steering mechanism 21. This prevents the marine vessel 10 from riding the crest of the wave 38, and the bow of the marine vessel 10 does not leave the wave crest. This results in that the impact force due to landing of the marine vessel 10 onto the water does not act on the vessel bottom of the marine vessel 10, which reduces damage to the hull 11.

In the present preferred embodiment, the optimum route with the lowest cost is generated using the cost maps 33, 37, and 39. This reduces minimizing the disadvantage coming from the avoidance of riding of the hull 11 on the crest of the wave 38.

Furthermore, in the present preferred embodiment, it is determined whether or not the hull 11 rides the crest of the wave for each wave, and only when necessary, the course is changed. This reduces a change in the course compared with the case in which the hull 11 is controlled so as to collectively avoid multiple waves. As a result, this avoids the unnecessary long period of time in which the marine vessel reaches the destination, and avoids large fuel consumption.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

For example, in the preferred embodiments described above, when it is determined that the hull 11 rides the wave crest of the wave 38, the BCU 22 generates an optimum route to avoid riding of the hull 11 on the wave crest. Alternatively, the BCU 22 may determine whether or not the bow of the hull 11 leaves the crest of the wave 38, and may generate an optimum route to avoid riding of the hull 11 on the wave crest when it is determined that that the bow of the hull 11 leaves the crest of the wave 38.

As another example, in the preferred embodiments described above, the BCU 22 uses a Kalman filter to track wave crests and further estimates the shape and movement of waves, but the BCU 22 may use a particle filter instead of the Kalman filter to track wave crests and estimate the shape and movement of waves.

In the preferred embodiments described above, the marine vessel 10 includes the outboard motors 12, but the outboard motors 12 may be replaced with inboard/outboard motors (stern drives or inboard motor/outboard drives) or inboard motors. In the case in which the marine vessel 10 includes inboard motors, the BCU 22 changes the course of the hull 11 so as to follow the generated optimum route by controlling the rudder provided separately from the inboard motors. In the case in which the marine vessel 10 includes inboard/outboard motors, the BCU 22 change the course of the hull 11 so as to follow the generated optimum route by controlling the drive unit. In the case in which the hull is provided with another type of steering (other examples of a steering) that performs the role of a rudder, such as a flap or an interceptor (e.g., "Zipwake"), the traveling direction of the marine vessel 10 may be changed by using the steering.

What is claimed is:

1. A hull behavior control system for controlling behavior of a hull of a marine vessel including a steering that changes a traveling direction of the marine vessel, the hull behavior control system comprising:
   a memory; and
   at least one controller coupled to the memory and configured or programmed to:
      control the steering that changes the traveling direction of the marine vessel;
      obtain a water surface shape around the marine vessel;
      estimate movement of a wave based on the water surface shape;
      upon determining that the hull rides the wave whose movement has been estimated, control the steering so as to reduce an influence of the wave on the hull; and
      upon determining that the hull rides a crest of the wave whose movement has been estimated, control the steering so that the hull avoids the crest of the wave.

2. The hull behavior control system according to claim 1, wherein the at least one controller is configured or programmed to:
   upon determining that the hull rides the crest of the wave whose movement has been estimated, control the steering so that the hull moves away from the crest of the wave.

3. The hull behavior control system according to claim 1, wherein the water surface shape is a three-dimensional water surface shape; and
   the at least one controller is configured or programmed to:
      extract the wave from undulation information of the three-dimensional water surface shape; and
      estimate movement of the extracted wave.

4. The hull behavior control system according to claim 3, wherein the at least one controller is configured or programmed to:
   delete information equal to or below an average water level from the undulation information; and
   extract the wave by fitting a curved surface function to the undulation information from which the information equal to or below the average water level has been deleted.

5. The hull behavior control system according to claim 3, wherein the at least one controller is configured or programmed to estimate the movement of the extracted wave by tracking the crest of the wave.

6. The hull behavior control system according to claim 1, wherein the at least one controller is configured or programmed to use a Kalman filter to estimate the movement of the wave.

7. The hull behavior control system according to claim 1, wherein
   the at least one controller is configured or programmed to:
      input a water surface image obtained by the at least one controller into a first machine learning model that has been trained; and
      estimate the movement of the wave based on a water surface shape output from the first machine learning model; and
   the first machine learning model is generated by machine learning using training data including water surface images associated with respective water surface shapes.

8. The hull behavior control system according to claim 1, wherein the at least one controller is configured or programmed to determine whether or not the hull rides the wave whose movement has been estimated based on at least a relative speed between the wave whose movement has been estimated and the marine vessel, and a traveling direction of the wave whose movement has been estimated.

9. The hull behavior control system according to claim 1, wherein
   the at least one controller is configured or programmed to:
      input, into a second machine learning model that has been trained, at least a relative speed between the wave whose movement has been estimated and the marine vessel, and a traveling direction of the wave whose movement has been estimated; and
      determine whether or not the hull rides the wave whose movement has been estimated using an output of the second learned model; and
   the second machine learning model is generated by machine learning using training data including at least relative speeds between the wave and the marine vessel and traveling directions of the wave, associated with respective collision possibilities between the marine vessel and the wave.

10. The hull behavior control system according to claim 1, wherein the at least one controller is configured or programmed to, upon determining that the hull rides the wave whose movement has been estimated, use a cost map to set an optimum route to reduce the influence of the wave on the behavior of the hull.

11. The hull behavior control system according to claim 10, wherein the cost map uses costs including a deviation amount from a straight water route of the marine vessel to a destination, vertical acceleration of the hull due to the wave whose movement has been estimated, and a roll angle generated in the hull.

12. The hull behavior control system according to claim 1, wherein
- the at least one controller is configured or programmed to:
  - input, into a third machine learning model that has been trained, a deviation amount from a straight water route of the marine vessel to a destination, vertical acceleration of the hull due to the wave whose movement has been estimated, and a roll angle generated in the hull; and
  - set an optimum route to reduce the influence of the wave on the behavior of the hull using an output of the third learned model; and
- the third machine learning model is generated by machine learning using training data including deviation amounts from the straight water route of the marine vessel to the destination, vertical accelerations of the hull due to the wave, and the roll angles generated in the hull, associated with respective optimum routes.

13. A marine vessel comprising:
the hull;
the steering to change the traveling direction of the marine vessel; and
the hull behavior control system according to claim 1.

\* \* \* \* \*